Oct. 31, 1961     A. J. OUELLETTE     3,006,688
BABY SEAT
Filed Jan. 30, 1959
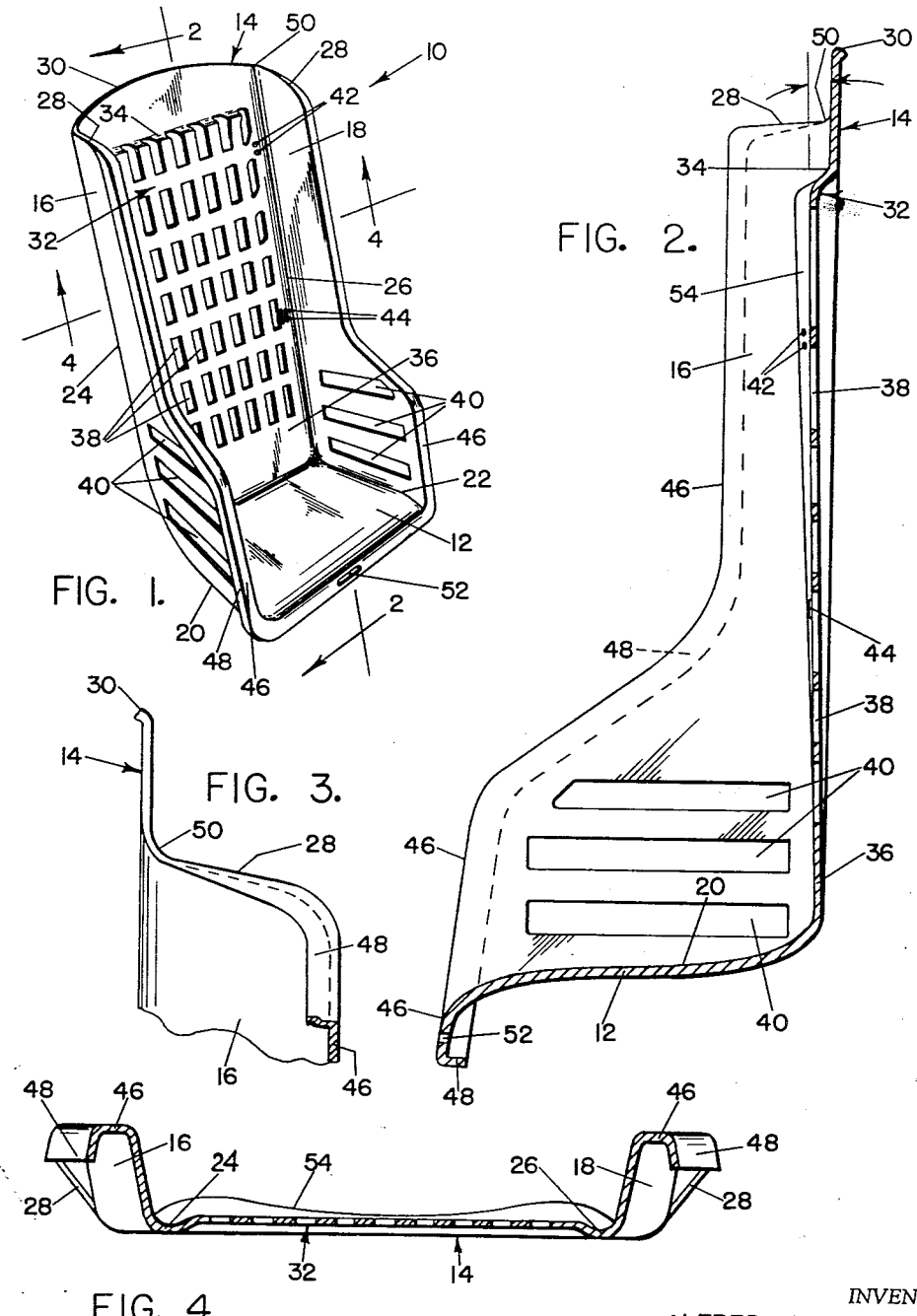
INVENTOR,
ALFRED J. OUELLETTE.
BY *Robert M. Dunning*
ATTORNEY

United States Patent Office 3,006,688
Patented Oct. 31, 1961

3,006,688
BABY SEAT
Alfred J. Ouellette, 680 Montcalm Place, St. Paul, Minn.
Filed Jan. 30, 1959, Ser. No. 790,184
10 Claims. (Cl. 297—457)

This invention relates to seats and deals particularly with a seat designed to be used primarily by infants. The seat is constructed so as to serve both as a seat when vertically supported or as a temporary bed when supported longitudinally.

Seats of this general character now available have a seat bottom, a solid seat back extending upwardly from the seat bottom, and sides secured to the seat bottom and marginal sides of the seat back. Due to the solid construction of the seat back, they are uncomfortable for infants and hence separate pads are utilized to impart some resiliency to the seat back area. These added pads are an additional expense to the production of the seats.

With these thoughts in mind, the instant invention contemplates an infant seat having a seat back which is resilient to the extent of providing a cushioned area over the major portion of the seat back. It is common practice in seats of this type to place the seats upon proper supports such as an adult chair or the like so that the seat back is disposed at an acute angle to the horizontal and it follows that the smaller the angle of the seat back to the horizontal the more weight of the infant is absorbed or diverted upon the seat back. As the seat back disclosed in the instant invention is resilient it will act as a cushion. This feature is especially effective when the seat is used to carry an infant from one place to another, the seat back cushions the infant from shock or bumps which normally are experienced when the seat is carried in the arms of an adult or upon the seat of an automobile.

A feature of the present invention resides in the provision of an infant seat which may be formed in its entirety from a sheet of flexible resilient material such as polyethylene which is a durable substance as well as one which may be effectively colored.

A further feature of this invention resides in the provision of suitable apertures and slots through which cords and straps may be attached for securing the seat to a suitable support and for strapping an infant into the seat.

An added feature of the present invention lies in the provision of an infant seat having a perforated back which reduces the weight of the seat and adds to the cushioning action of the back.

These and other novel features and advantages will appear from the following description taken in connection with the drawings wherein:

FIGURE 1 is a perspective view of the new infant seat.

FIGURE 2 is an enlarged vertical sectional view taken substantially on line 2—2 through the seat as depicted in FIGURE 1.

FIGURE 3 is a fragmentary view of a portion of the seat side and integrally formed marginal flange.

FIGURE 4 is a transverse sectional view taken through the seat back substantially on line 4—4 of FIGURE 1.

The infant seat, generally indicated by the numeral 10, is formed of a sheet of flexible resilient material and is a one piece structure save for the detachable cords and straps which are not shown in the drawings.

The infant seat is provided with a seat bottom 12 and a seat back generally indicated by the numeral 14. Side panels 16 and 18 are secured to the seat bottom 12 along opposite edges 20 and 22 and to the seat back along opposite edges 24 and 26. The upper edges 28 of the sides 16 and 18 may be slightly tapered to form a continuous line with the upper edge 30 of the seat back 14.

An offset central portion generally indicated by the numeral 32 extends from a transverse line 34 on the inner surface of the seat back near the upper edge thereof to a transverse line near the seat bottom 12 approximately located at 36. This offset portion projects forwardly of the vertical seat edges 24 and 26 and is provided with a series of spaced slots or apertures 38. The primary purpose of the slots is to add resiliency to the offset portion. However, they provide ventilation to the seat and are a method of conserving material which also tends to decrease the overall weight of the finished article.

The widened portions of the side panels 16 and 18 adjacent the seat bottom are similarly provided with elongated slots 40 for the purpose of conserving material and to provide ventilation.

The upper portion of the seat back is provided on each side along edges 24 and 26 with a pair of apertures 42. Cords or the like may be attached through these apertures so that the infant seat may be secured to a support such as the back of an adult chair or to the back of an automobile seat.

A pair of slots 44 are disposed through the seat back at a point below a transverse centerline through which straps may be secured for holding an infant in the seat.

The infant seat is further provided with a marginal flange 46 extending at substantially a right angle from the sides 16 and 18 and from the seat bottom 12. A further flange 48 is secured to the flange 46 and extends rearwardly at substantially a right angle. The flanges 46 and 48 combine with the sides 16 and 18 and seat bottom 12 to form channel-shaped marginal reinforcements, as well as an effective means for grasping the seat. The flanges both extend upwardly of the sides to terminate at point 50 adjacent the upper edge 30 of the seat back.

A slot 52 is disposed through the flange 46 adjacent the seat bottom. This slot is adapted to accommodate an infant restraining strap designed to extend between the legs of the infant and to connect with the transverse straps anchored in the slots 44, or to serve as a support for anchoring straps.

As best seen in FIGURE 4, the inner surface of the offset portion 32 may be provided with a concave curve as indicated at 54 extending transversely between the marginal edges 24 and 26. This curve is adapted to accommodate the contours of an infant's body, adding to the comfort of the infant seat.

From the foregoing specification it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded unnecessary.

Changes in shape, size, and arrangement of details and parts such as come within the purview of the invention claimed may be resorted to in actual practice, if desired.

I claim:
1. A baby seat comprising a body of flexible resilient sheet material including a seat bottom, a seat back extending upwardly from said bottom, and unitary sides secured to opposite edges of said seat bottom and said seat back, said seat back having an offset central portion extending through the major portion of its width and terminating closely adjacent to the upper edge of said seat back, said central portion being offset forwardly from the marginal portions of the seat back, said offset portion being substantially flat in vertical section, said central portion forming a resilient cushioning member when the marginal portion of the seat back is against a support.

2. The structure of claim 1 and including a marginal generally channel-shaped reinforcing and stiffening edge along the forward edges of the sides and seat bottom.

3. The structure of claim 1 and including a marginal reinforcing edge which is stiff and rigid relative to the remainder of the body.

4. The structure as set forth in claim 1 and in which the forward edges of said sides and said seat bottom are provided with a substantially right angularly extending marginal flange, a further flange secured to said first mentioned flange and extending rearwardly therefrom.

5. The structure as set forth in claim 1 and in which said central offset portion is provided with a transverse curve of concave section between said marginal portions.

6. The structure as set forth in claim 1 and in which said central offset portion is provided with a series of transversely and vertically spaced slots for the purpose of imparting additional resiliency to said offset portion.

7. A baby seat comprising a one-piece body of flexible resilient sheet material including a seat portion having front, rear and side edges, a back portion extending upwardly from the rear edge of said seat portion with the lower, upper and side edges thereof residing in a plane forming an obtuse angle with said seat portion, said back portion having a raised section extending from the rear edge of said seat portion at a lesser obtuse angle than said plane so that said section is offset to a greater degree near the upper edge of said back portion, and slightly diverging side portions integral with the side edges of said seat portion and the side edges of said back portion, said side portions having their lower edges coextensive in depth to that of the side edges of said seat portion and having a lesser depth nearer the upper edge of said back portion.

8. The structure as set forth in claim 7 in which said raised section is provided with rectangular slots oriented in a parallel relationship to the side edges of said back portion.

9. The structure as set forth in claim 8 including an integral reinforcing flange extending along the front edge and following the contour of said side portions to a lcous near the upper ends of said side portions.

10. A baby seat comprising a one-piece body of flexible resilient sheet material including a seat portion having front, rear and side edges, a back portion extending upwardly from the rear edge of said seat portion with the lower, upper and side edges thereof residing in a plane forming a predetermined angle with said seat portion, said back portion having a raised section extending from the rear edge of the seat portion at a lesser angle than said plane so that said section is offset to a greater degree near the upper edge of said back portion, and side portion integral with the side edges of said seat portion and the side edges of said back portion.

References Cited in the file of this patent
UNITED STATES PATENTS

| | | |
|---|---|---|
| D. 183,233 | Ahrens | July 22, 1958 |
| 1,576,613 | Kellogg | Mar. 16, 1926 |
| 2,324,421 | Ouellette | July 13, 1943 |
| 2,808,875 | Bargen | Oct. 8, 1957 |
| 2,818,107 | Thaden | Dec. 31, 1957 |